US012555792B2

(12) United States Patent
Bizet et al.

(10) Patent No.: US 12,555,792 B2
(45) Date of Patent: Feb. 17, 2026

(54) ELECTRODE FORMULATION FOR A Li-ion BATTERY AND SOLVENT-FREE METHOD FOR ELECTRODE MANUFACTURING

(71) Applicant: Arkema France, Colombes (FR)

(72) Inventors: Stephane Bizet, Serquigny (FR); Anthony Bonnet, Colombes (FR); Oleksandr Korzhenko, Lacq (FR); Samuel Devisme, Serquigny (FR)

(73) Assignee: Arkema France, Puteaux (FR)

( * ) Notice: Subject to any disclaimer, the term of this patent is extended or adjusted under 35 U.S.C. 154(b) by 831 days.

(21) Appl. No.: 17/795,014

(22) PCT Filed: Jan. 29, 2021

(86) PCT No.: PCT/FR2021/050167
§ 371 (c)(1),
(2) Date: Jul. 25, 2022

(87) PCT Pub. No.: WO2021/152268
PCT Pub. Date: Aug. 5, 2021

(65) Prior Publication Data
US 2023/0084468 A1     Mar. 16, 2023

(30) Foreign Application Priority Data

Jan. 29, 2020  (FR) .................................. FR2000864

(51) Int. Cl.
| | |
|---|---|
| *H01M 4/62* | (2006.01) |
| *H01M 4/02* | (2006.01) |
| *H01M 4/1391* | (2010.01) |
| *H01M 4/1393* | (2010.01) |
| *H01M 4/1395* | (2010.01) |
| *H01M 4/38* | (2006.01) |
| *H01M 4/485* | (2010.01) |
| *H01M 4/583* | (2010.01) |
| *H01M 4/587* | (2010.01) |
| *H01M 10/0525* | (2010.01) |

(52) U.S. Cl.
CPC ......... *H01M 4/623* (2013.01); *H01M 4/1391* (2013.01); *H01M 4/1393* (2013.01); *H01M 4/1395* (2013.01); *H01M 4/382* (2013.01); *H01M 4/386* (2013.01); *H01M 4/485* (2013.01); *H01M 4/5835* (2013.01); *H01M 4/587* (2013.01); *H01M 4/625* (2013.01); *H01M 4/626* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2001/0012588 A1* | 8/2001 | Kaido ................. | H01M 4/0416 118/58 |
| 2014/0302397 A1 | 10/2014 | Van Bommel et al. | |
| 2015/0357648 A1 | 12/2015 | Sugimoto et al. | |
| 2016/0017136 A1 | 1/2016 | Hochstetter et al. | |
| 2018/0076444 A1* | 3/2018 | Chauveau ............ | H01M 4/625 |
| 2023/0078004 A1* | 3/2023 | Bizet ..................... | H01M 4/661 429/231.95 |
| 2023/0084563 A1* | 3/2023 | Bizet .................. | H01M 4/0471 429/231.95 |

FOREIGN PATENT DOCUMENTS

| | | |
|---|---|---|
| WO | WO9727260 A1 | 7/1997 |
| WO | WO0049103 A1 | 8/2000 |
| WO | WO2015187769 A2 | 12/2015 |
| WO | WO18199702 A1 | 11/2018 |

OTHER PUBLICATIONS

Lithium titanate, available online at https://en.wikipedia.org/wiki/Lithium_titanate, date unknown.*
Journal of the Electrochemical Society, 166 (10) pp. A2151-A2157 (2019) "Influence of Polyvinylidene Fluoride (PVDF) Binder Properties on LiNi0.33CO0.33Mn0.33o2 (NMC) Electrodes Made by a Dry-Powder-Coating Process" Ming Wang, Jiazhi Hu, Yikai Wang and Yang-Tse Cheng; Dept. of Chemical & Materials Engineering, UNV Kentucky, Lexington Kentucky 40506 USA.

* cited by examiner

*Primary Examiner* — Anca Eoff
(74) *Attorney, Agent, or Firm* — Joanne Rossi

(57) ABSTRACT

The present invention relates generally to the field of electrical energy storage in rechargeable secondary batteries of Li-ion type. More specifically, the invention relates to an electrode formulation for a Li-ion battery, comprising a binder based on a mixture of fluoropolymers. The invention also relates to a process for preparing electrodes using said formulation, by a technique of solvent-free deposition on a metal substrate. The invention relates finally to an electrode obtained by this process and also to Li-ion secondary batteries comprising at least one such electrode.

21 Claims, No Drawings

ELECTRODE FORMULATION FOR A Li-ion BATTERY AND SOLVENT-FREE METHOD FOR ELECTRODE MANUFACTURING This application is a national stage application under 35 U.S.C. § 371 of PCT Application PCT/FR2021/050167, filed 29 Jan. 2021; which claims benefit to French National U.S. Pat. No. 2000864, filed 29 Jan. 2020; said applications incorporated herein by reference.

FIELD OF THE INVENTION

The present invention relates generally to the field of electrical energy storage in rechargeable secondary batteries of Li-ion type. More specifically, the invention relates to an electrode formulation for a Li-ion battery, comprising a binder based on a mixture of fluoropolymers. The invention also relates to a process for preparing electrodes using said formulation, by a technique of solvent-free deposition on a metal substrate. The invention relates finally to an electrode obtained by this process and also to Li-ion secondary batteries comprising at least one such electrode.

TECHNICAL BACKGROUND

A Li-ion battery comprises at least one negative electrode or anode coupled to a copper current collector, a positive electrode or cathode coupled to an aluminum current collector, a separator and an electrolyte. The electrolyte consists of a lithium salt, generally lithium hexafluorophosphate, mixed with a solvent that is a mixture of organic carbonates, which are selected in order to optimize ion transportation and dissociation.

Rechargeable, or secondary, batteries are more advantageous than primary batteries (which are not rechargeable) because the associated chemical reactions taking place at the positive and negative electrodes of the battery are reversible. The electrodes of the secondary cells can be regenerated multiple times by application of an electrical charge. Many advanced electrode systems have been developed for storing the electrical charge. In parallel, great efforts have been devoted to developing electrolytes capable of improving the capacities of electrochemical cells.

For their part, the electrodes generally comprise at least one current collector on which is deposited, in the form of a film, a composite material consisting of: a material termed active because it exhibits electrochemical activity toward lithium, a polymer which acts as binder, plus one or more electronically conductive additives which are generally carbon black or acetylene black, and optionally a surfactant.

Binders are counted among the so-called inactive components, because they do not contribute directly to the capacity of the cells. However, their key role in the treatment of the electrodes and their considerable influence on the electrochemical performance of electrodes have been widely described. The principal relevant physical and chemical properties of binders are: thermal stability, chemical and electrochemical stability, tensile strength (strong adhesion and cohesion) and flexibility. The main purpose of using a binder is to form stable networks of the solid components of the electrodes, that is to say the active materials and the conductive agents (cohesion). In addition, the binder must ensure close contact between the composite electrode and the current collector (adhesion).

Polyvinylidene fluoride (PVDF) is the binder most commonly used in lithium-ion batteries on account of its excellent electrochemical stability, good adhesion capacity and strong adhesion to the materials of the electrodes and of the current collectors. However, PVDF can be dissolved only in certain organic solvents such as N-methylpyrrolidone (NMP), which is volatile, flammable, explosive and highly toxic, causing serious environmental problems. The use of organic solvents requires significant investment in production, recycling and purification facilities. If the electrodes of lithium-ion batteries are produced in a solvent-free process, while complying with the same specifications, then the carbon footprint and the production costs will be considerably reduced.

The article by Wang et al. (J. Electrochem. Soc. 2019 166(10): A2151-A2157) analyzed the influence of several properties of PVDF binders on electrodes manufactured by a dry powder coating process (electrostatic spray deposition). To improve the adhesion to the metal substrate and the cohesion of the electrode, a heat treatment step of 1 hour at 200° C. is carried out. The electrode contains 5% by weight of binder. Two binders of different viscosities are used: HSV900 (50 kpoise) and a grade from Alfa Aesar (25 kpoise).

The fluid binder results in the best adhesion but in behavior at high discharge rate which is worse than the viscous binder (capacity retention improves under these conditions, going from 17% to 50% without reducing the binding strength and the long-term cycling performance). The porosity of the binder layer increases with the molecular weight of the PVDF.

The impact of different PVDF blends on the properties of electrodes manufactured by a dry coating process was not, however, described.

Compared to the conventional method of producing electrodes in a wet suspension, dry (solvent-free) production processes are simpler; such processes eliminate the emission of volatile organic compounds and offer the possibility of producing electrodes having greater thicknesses (>120 µm), with a higher energy density in the final energy storage device. The change in the production technology will have a small impact on the active material of the electrodes; however, the polymer additives responsible for the mechanical integrity of the electrodes and the electrical behavior thereof must be suitable for the new manufacturing conditions.

There is still a need to develop new electrode compositions for Li-ion batteries which are suitable for implementation without the use of organic solvents.

The objective of the invention is therefore to provide a Li-ion battery electrode composition capable of being transformed.

The invention also aims to provide a process for producing an electrode for a Li-ion battery employing said formulation, by a technique of solvent-free deposition on a metal substrate. The invention lastly relates to an electrode obtained by this process.

Finally, the invention aims to provide rechargeable Li-ion secondary batteries comprising at least one such electrode.

SUMMARY OF THE INVENTION

The technical solution proposed by the present invention is an electrode composition for a Li-ion battery, comprising a binder based on a mixture of at least two fluoropolymers having different melt viscosities.

The invention relates firstly to a Li-ion battery electrode comprising an active filler for anode or cathode, an electronically conductive filler and a fluoropolymer(-based) binder.

Characteristically, said binder consists of a mixture of two fluoropolymers, a fluoropolymer A and a fluoropolymer B, said fluoropolymers A and B having different melt viscosities.

The invention also relates to a process for producing a Li-ion battery electrode, said process comprising the following operations:
- mixing the active filler, the polymer binder and the conductive filler by means of a process that makes it possible to obtain an electrode formulation that can be applied to a metal support by a "solvent-free" process;
- depositing said electrode formulation on the metal substrate by a "solvent-free" process so as to obtain a Li-ion battery electrode, and
- consolidating said electrode by a heat treatment and/or thermomechanical treatment.

The invention also relates to a Li-ion battery electrode produced by the process described above.

The invention also provides a Li-ion secondary battery comprising a negative electrode, a positive electrode and a separator, wherein at least one electrode is as described above.

The present invention makes it possible to overcome the disadvantages of the prior art. More particularly, it provides a technology that makes it possible to:
- control the distribution of the binder and of the conductive filler on the surface of the active filler;
- ensure the cohesion and the mechanical integrity of the electrode by guaranteeing good film formation or consolidation of the formulations, which can be difficult to achieve for solvent-free processes;
- generate adhesion on the metal substrate;
- ensure the homogeneity of the electrode composition in the thickness and width of the electrode;
- control the privacy of the electrode and ensure the homogeneity thereof in the thickness and width of the electrode;
- reduce the overall content of binder in the electrode, which, in the case of the known solvent-free processes, remains greater than that of a standard slurry process;
- improve the mechanical strength of self-supporting films of electrode formulations. This means that when the solvent-free electrode production process proceeds via an intermediate phase of production of a self-supporting film of the formulation prior to assembly on the current collector, the formulation makes it possible to attain mechanical behavior sufficient for the handling and winding/unwinding phases.

The advantage of this technology is to improve the following properties of the electrode: the homogeneity of the composition in the thickness, the homogeneity of the porosity, the cohesion, and the adhesion to the metal substrate. It also allows the reduction of the content of binder needed in the electrode, and also the reduction of the heat treatment temperature and time in order to control the porosity and improve the adhesion.

DESCRIPTION OF EMBODIMENTS OF THE INVENTION

The invention is now described in greater detail and in a nonlimiting manner in the description that follows.

According to a first aspect, the invention relates to a Li-ion battery electrode comprising an active filler for anode or cathode, an electronically conductive filler and a fluoropolymer binder.

Characteristically, said binder consists of a mixture of at least two fluoropolymers having different melt viscosities, namely:
- a fluoropolymer A, the melt viscosity of which is greater than or equal to 1000 Pa·s at 232° C. and at a shear of 100 s$^{-1}$, and
- a fluoropolymer B having a viscosity at least 250 Pa·s lower, at 232° C. and at a shear of 100 s$^{-1}$, than that of the polymer A.

According to various embodiments, said electrode comprises the features below, in combination where appropriate. The stated contents are expressed by weight, unless otherwise stated.

The invention uses fluoropolymers. The term "fluoropolymer" means a polymer including fluorine groups —F. The fluoropolymer contains in its chain at least one monomer chosen from the compounds containing a vinyl group capable of opening in order to polymerize and which contains, directly attached to this vinyl group, at least one fluorine atom, a fluoroalkyl group or a fluoroalkoxy group.

By way of example of a fluorinated vinyl monomer which is part of the composition of the fluoropolymers A and B, mention may be made of: vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), 5-perfluoro (ethyl vinyl) ether (PEVE) and perfluoro(propyl vinyl) ether (PPVE); perfluoro(1,3-dioxole); perfluoro(2,2-dimethyl-1, 3-dioxole) (PDD); the product of formula $CF_2=CFOCF_2CF(CF_3)OCF_2CF_2X$ wherein X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)nCH_2OCF=CF_2$ wherein n is 1, 2, 3, 4 or 5; the product of formula $R_1CH_2OCF=CF_2$ wherein $R_1$ is hydrogen; the product of formula $R_2OCF=CH_2$ wherein $R_2$ is $F(CF_2)p$ and p is 1, 2, 3 or 4; perfluorobutyl ethylene (PFBE); 3,3,3-trifluoropropene and 2-trifluoromethyl-3,3,3-trifluoro-1-propene.

The fluoropolymer which is part of the composition of each of the polymers A and B can be: a homopolymer, or a copolymer comprising two more fluormonomers listed above, or else mixtures of homopolymer and of copolymer, or mixtures of two copolymers; it can also comprise nonfluoro comonomers such as ethylene.

The fluoropolymers A and B can have similar structures (comprising the same monomers), or else can have different structures.

According to one embodiment, said binder contains:
- a fluoropolymer A which comprises a VDF homopolymer and/or at least one copolymer of vinylidene fluoride (VDF) and hexafluoropropylene (HFP), the melt viscosity of which is greater than or equal to 1000 Pa·s at 232° C. and under a shear of 100 s$^{-1}$, and
- a fluoropolymer B which comprises a VDF homopolymer and/or at least one VDF-HFP copolymer, said fluoropolymer B having a viscosity at least 250 Pa·s lower, at 232° C. and at a shear of 100 s$^{-1}$, than that of the polymer A.

According to one embodiment, the fluoropolymer A comprises at least one VDF homopolymer and/or at least one VDF-HFP copolymer having an HFP content of greater than or equal to 1% by weight, preferably greater than or equal to 3%, advantageously greater than or equal to 6%. Said VDF-HFP copolymer has an HFP content of less than or equal to 55%, preferably less than or equal to 50%.

According to one embodiment, the fluoropolymer A consists of a single VDF-HFP copolymer having an HFP content of greater than or equal to 1%. According to one embodiment, the HFP content of this VDF-HFP copolymer is between 3% and 55%, limits included, preferably between 6% and 50%, limits included.

According to one embodiment, the fluoropolymer A consists of a mixture of two or more VDF-HFP copolymers, the HFP content of each copolymer being greater than or equal to 1%. According to one embodiment, each of the copolymers has an HFP content of between 3% and 55%, limits included, preferably between 6% and 50%, limits included.

According to one embodiment, the fluoropolymer A is a vinylidene fluoride (VDF) homopolymer or a mixture of vinylidene fluoride homopolymers.

According to one embodiment, the fluoropolymer A has a melt viscosity greater than or equal to 1000 Pa·s, preferably greater than or equal to 1500 Pa·s, and advantageously greater than or equal to 2000 Pa·s at 232° C. and at a shear of 100 s$^{-1}$. The viscosity is measured at 230° C., at a shear gradient of 100 s$^{-1}$, using a capillary rheometer or a parallel-plate rheometer in accordance with standard ASTM D3825. The two methods give similar results.

According to one embodiment, the fluoropolymer B is a mixture of PVDF homopolymer with a VDF-HFP copolymer or else a mixture of two or more VDF-HFP copolymers.

According to one embodiment, the fluoropolymer B is a vinylidene fluoride (VDF) homopolymer or a mixture of vinylidene fluoride homopolymers.

According to one embodiment, the fluoropolymer B consists of a single VDF-HFP copolymer having an HFP content of greater than or equal to 1%. According to one embodiment, the HFP content of this VDF-HFP copolymer is between 3% and 55%, limits included, preferably between 6% and 50%, limits included.

According to one embodiment, the fluoropolymer B has a viscosity at least 250 Pa·s lower, at 232° C. and at a shear of 100 s$^{-1}$, than that of the polymer A, and preferentially at least 500 Pa·s lower than that of the polymer A and advantageously at least 750 Pa·s lower than that of the polymer A.

The fluoropolymers used in the invention can be obtained by known polymerization methods, such as solution, emulsion or suspension polymerization. According to one embodiment, they are prepared by an emulsion polymerization process in the absence of a fluorinated surfactant.

According to one embodiment, said mixture contains:
i. a weight content of polymer A of greater than or equal to 1% and less than or equal to 20%, preferentially greater than or equal to 5% and less than or equal to 20%, and
ii. a weight content of polymer B of less than or equal to 99% and greater than or equal to 80%, preferably less than or equal to 95% and greater than or equal to 80%.

The active materials at the negative electrode are generally lithium metal, graphite, silicon/carbon composites, silicon, fluorographites of $CF_x$ type with x between 0 and 1, and lithium titanates.

The active materials at the positive electrode are generally of the $LiMO_2$ type, of the $LiMPO_4$ type, of the $Li_2MPO_3F$ type, of the $Li_2MSiO_4$ type, where M is Co, Ni, Mn, Fe or a combination of these, of the $LiMn_2O_4$ type or of the $S_8$ type.

The conductive fillers are chosen from carbon blacks, graphites, natural or synthetic, carbon fibers, carbon nanotubes, metal fibers and powders, and conductive metal oxides. They are preferentially chosen from carbon blacks, natural or synthetic graphites, carbon fibers and carbon nanotubes.

A mixture of these conductive fillers may also be produced. In particular, the use of carbon nanotubes in combination with another conductive filler such as carbon black can have the advantages of reducing the content of conductive fillers in the electrode and of reducing the content of polymer binder on account of a lower specific surface area compared to carbon black.

According to one embodiment, a polymeric dispersant that is different to said binder is used in a mixture with the conductive filler in order to break up the agglomerates present and to aid the dispersion thereof in the final formulation with the polymer binder and the active filler. The polymeric dispersant is chosen from poly(vinylpyrrolidone), poly(phenylacetylene), poly(meta-phenylene vinylidene), polypyrrole, poly(para-phenylene benzobisoxazole), poly(vinyl alcohol) and mixtures thereof.

The composition by weight of the electrode is:
50% to 99% of active filler, preferably from 50% to 99%,
25% to 0.05% of conductive filler, preferably from 25% to 0.5%,
25% to 0.05% of polymer binder, preferably from 25% to 0.5%,
0 to 5% of at least one additive chosen from the list: plasticizer, ionic liquid, dispersant for the conductive fillers, flow agent for the formulation, fibrillating agent such as polytetrafluoroethylene (PTFE),
the sum of all these percentages being 100%.

The invention also relates to a process for producing a Li-ion battery electrode, said process comprising the following steps:
mixing the active filler, the polymer binder, the conductive filler and any additives by means of a process that makes it possible to obtain an electrode formulation that can be applied to a metal support by a solvent-free process;
depositing said electrode formulation on the metal substrate by a "solvent-free" process so as to obtain a Li-ion battery electrode and
consolidating said electrode by a heat treatment (application of a temperature ranging up to 50° C. above the melting temperature of the polymer, without mechanical pressure) and/or thermomechanical treatment such as calendering.

A "solvent-free" process is understood as meaning a process in which there is no need for a step of evaporation of residual solvent downstream of the deposition step.

Another embodiment of the process for producing an electrode comprises the following steps:
mixing the active filler, the polymer binder and the conductive filler by means of a process that makes it possible to obtain an electrode formulation, the constituents of which are mixed homogeneously;
producing a self-supporting film of the formulation by means of a thermomechanical process such as extrusion, calendering or thermocompression;
depositing the self-supporting film on the metal substrate by a calendering or thermocompression process, and
consolidating said electrode by a heat treatment and/or thermomechanical treatment such as calendering for example, the latter step being optional if the preceding step already achieves a sufficient degree of adhesion and/or porosity.

Step of Preparing the Electrode Formulation

The polymers A and B are in the form of a powder, the mean particle size of which is between 10 nm and 1 mm, preferentially between 50 nm and 500 µm and even more preferentially between 50 nm and 50 µm.

The fluoropolymer powder may be obtained by various processes. The powder may be obtained directly by an emulsion or suspension synthetic process by drying by spray-drying or by freeze-drying. The powder may also be obtained by milling techniques, such as cryomilling. On completion of the powder production step, the particle size can be adjusted and optimized by selection or screening methods.

According to one embodiment, the polymers A and B are introduced at the same time as the active and conductive fillers at the time of the mixing step.

According to another embodiment, the polymers A and B are mixed together before mixing with the active and conductive fillers. For example, a mixture of polymers A and B can be produced by co-spraying of the latices of polymers A and B to obtain a mixture in powder form. The mixture thus obtained can, in turn, be mixed with the active and conductive fillers.

Another embodiment of the mixing step consists in proceeding in two steps. Firstly, either polymer A or polymer B or both are mixed with a conductive filler by a solvent-free process or by co-spraying. This step makes it possible to obtain an intimate mixture of the binder and the conductive filler. Then, in a second step, the binder and the conductive filler, which have been premixed, and the optional fluoropolymer not yet used are mixed with the active filler. The mixing of the active filler with said intimate mixture is carried out using a solvent-free mixing process, to obtain an electrode formulation.

Another embodiment of the mixing step consists in proceeding in two steps. First, either polymer A or polymer B or both are mixed with an active filler by a solvent-free process or a process of spraying a liquid containing the binder and/or the conductive filler onto a fluidized powder bed of the active filler. This step makes it possible to obtain an intimate mixture of the binder and the active filler. Then, in a second step, the binder, the active filler and the optional optional fluoropolymer not yet used are mixed with the conductive filler.

Another embodiment of the mixing step consists in proceeding in two steps. Firstly, an active filler is mixed with a conductive filler by a solvent-free process. Then, in a second step, either the two polymers A and B are mixed at the same time with the premixed active filler and conductive filler, or the polymers A and B are mixed one after the other with the premixed active filler and conductive filler.

Solvent-free mixing processes for the various constituents of the electrode formulation include, without this being an exhaustive list: mixing by agitation, air-jet mixing, high-shear mixing, mixing with a V-mixer, mixing with a screw mixer, double-cone mixing, drum mixing, conical mixing, double Z-arm mixing, mixing in a fluidized bed, mixing in a planetary mixer, mixing by mechanofusion, mixing by extrusion, mixing by calendering, mixing by milling.

Other mixing processes include mixing options that employ a liquid such as water, for example spray drying (co-spraying) or a process of spraying a liquid containing the binder and/or the conductive filler onto a fluidized powder bed of the active filler.

At the end of this mixing step, the formulation obtained may undergo a final step of milling and/or screening and/or selection in order to optimize the size of the particles of the formulation in preparation for the step of deposition on the metal substrate.

The formulation in powder form is characterized by the bulk density. It is known in the art that low-density formulations are very restrictive in terms of the uses and applications thereof. The main components contributing to the increase in density are carbon-based additives such as carbon black (bulk density of less than 0.4 $g/cm^3$), carbon nanotubes (bulk density of less than 0.1 $g/cm^3$), polymer powders (bulk density of less than 0.9 $g/cm^3$). A combination of the low-density components in order to obtain an additive combining polymer binder/electron conductor/other additive is recommended in order to improve the premixing step downstream of the deposition of the formulation described above. Such a combination can be produced by the following methods:

a) dispersion of the components in water or the organic solvent, followed by elimination of the solvent (co-spraying, freeze-drying, extrusion/compounding in the presence of the solvent or of water);

b) dry or "wet" co-milling using a known milling method such as a ball or bead mill, followed by a drying step if necessary.

Such a method is particularly advantageous for the significant increase of the bulk density.

Step of Depositing Said Electrode Formulation on a Support

According to one embodiment, the end of the mixing step, the electrode is manufactured by means of a solvent-free powder coating method, by depositing the formulation on the metal substrate by a process of pneumatic spraying, electrostatic spraying, dipping in a fluidized powder bed, dusting, electrostatic transfer, deposition with rotary brushes, deposition with rotary metering rolls, calendering.

According to one embodiment, at the end of the mixing step, the electrode is manufactured by a two-step solvent-free powder coating process. A first step is carried out which consists in producing a self-supporting film from the formulation which has been premixed by means of a thermomechanical process such as extrusion, calendering or thermocompression. Then this self-supporting film is assembled with the metal substrate by a process combining temperature and pressure such as calendering or thermocompression.

The metal supports of the electrodes are generally made of aluminum for the cathode and of copper for the anode. The metal supports may be surface-treated and have a conductive primer with a thickness of 5 µm or more. The supports may also be carbon fiber woven or nonwoven fabrics.

Step of Consolidating the Electrode

The consolidation of said electrode is effected by a heat treatment, by passage through an oven, under an infrared lamp, through a calender with heated rollers or through a press with heated plates. Another alternative consists of a two-step process. First of all, the electrode is subjected to a heat treatment in an oven, under an infrared lamp or by contact with heated plates without pressure. A step of compression at ambient or elevated temperature is then carried out by means of a calender or a plate press. This step makes it possible to adjust the porosity of the electrode and to improve adhesion on the metal substrate.

The invention also relates to a Li-ion battery electrode produced by the process described above.

According to one embodiment, said electrode is an anode.

According to one embodiment, said electrode is a cathode.

The invention also provides a Li-ion secondary battery comprising a negative electrode, a positive electrode and a separator, wherein at least one electrode is as described above.

The invention claimed is:

1. A Li-ion battery electrode comprising an active filler for anode or cathode, an electronically conductive filler and a fluoropolymer binder, characterized in that said binder consists of the mixture of: a fluoropolymer A, the melt viscosity of which is greater than or equal to 1000 Pa·s at 232° C. and at a shear of 100 s$^{-1}$, and of a fluoropolymer B having a melt viscosity of at least 250 Pa·s lower, at 232° C. and at a shear of 100 s$^{-1}$, than that of fluoropolymer A, wherein the fluoropolymer A consists of one or more copolymers of vinylidene fluoride (VDF) and hexafluoropropylene (HFP), the HFP content of each copolymer being greater than or equal to 3% by weight.

2. The electrode of claim 1, wherein said fluoropolymer B contains at least one repeating unit derived from a fluoromonomer chosen from the group consisting of: vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers; perfluoro(1,3-dioxole); perfluoro(2,2-dimethyl-1,3-dioxole) (PDD); a product of formula $CF_2$=$CFOCF_2CF(CF_3)OCF_2CF_2X$ wherein X is $SO_2F$, $CO_2H$, $CH_2OH$, $CH_2OCN$ or $CH_2OPO_3H$; $CF_2$=$CFOCF_2CF_2SO_2F$; a product of formula $F(CF_2)nCH_2OCF$=$CF_2$ wherein n is 1, 2, 3, 4 or 5; a product of formula $R_1CH_2OCF$=$CF_2$ wherein $R_1$ is hydrogen; a product of formula $R_2OCF$=$CH_2$ wherein $R_2$ is $F(CF_2)$ p and p is 1, 2, 3 or 4; perfluorobutyl ethylene (PFBE); 3,3,3-trifluoropropene; and 2-trifluoromethyl-3,3,3-trifluoro-1-propene.

3. The electrode of claim 1,
fluoropolymer B comprises a VDF homopolymer and/or at least one VDF-HFP copolymer.

4. The electrode of claim 1, wherein said fluoropolymer A has a viscosity of greater than or equal to 1500 Pa·s at 232° C. and at a shear of 100 s$^{-1}$.

5. The electrode of claim 1, wherein the fluoropolymer A consists of a copolymer of vinylidene fluoride (VDF) and hexafluoropropylene (HFP) having an HFP content of greater than or equal to 3% by weight.

6. The electrode of claim 1, wherein the fluoropolymer A consists of a mixture of two or more copolymers of vinylidene fluoride (VDF) and hexafluoropropylene (HFP), the HFP content of each copolymer being greater than or equal to 3% by weight.

7. The electrode of claim 1, wherein said fluoropolymer B has a viscosity at least 500 Pa·s lower, at 232° C., at a shear of 100 s$^{-1}$, than that of the fluoropolymer A.

8. The electrode of claim 1, wherein the fluoropolymer B is a homopolymer of vinylidene fluoride or a mixture of homopolymers of vinylidene fluoride.

9. The electrode of claim 1, wherein the fluoropolymer B consists of a VDF-HFP copolymer having an HFP content of between 3% and 55% by weight.

10. The electrode of claim 1, wherein the fluoropolymer B consists of a mixture of two or more VDF-HFP copolymers.

11. The electrode of claim 1, wherein said mixture comprises:
i. a weight content of fluoropolymer A of greater than or equal to 1% and less than or equal to 20%, and
ii. a weight content of fluoropolymer B of less than or equal to 99% and greater than 80%.

12. The electrode of claim 1, wherein said active filler is selected from the group consisting of lithium metal, graphite, silicon/carbon composites, silicon, graphene, fluorographites of the formula CFx where x is between 0 and 1 and lithium titanates.

13. The electrode of claim 1, wherein said active filler is selected from the group consisting of $LiMO_2$, of $LiMPO_4$, $Li_2MPO_3F$, $Li_2MSiO_4$ where M is Co, Ni, Mn, Fe or a combination of these, $LiMn_2O_4$ and $S_8$.

14. The electrode of claim 1, having the following composition by weight:
50% to 99.9% of active filler,
0.05% to 25% of electronically conductive filler,
0.05% to 25% of fluoropolymer binder,
0 to 5% of at least one additive chosen from the list: plasticizer, ionic liquid, dispersant for the fillers, flow agent for the formulation, fibrillating agent,
the sum of all these percentages being 100%.

15. A process for manufacturing the Li-ion battery electrode of claim 1, said process comprising the following steps:
mixing the active filler, the fluoropolymer binder and the electronically conductive filler by means of a process which makes it possible to obtain an electrode formulation that can be applied to a metal substrate by a solvent-free process;
depositing said electrode formulation on the metal substrate by a solvent-free process so as to obtain a Li-ion battery electrode, and
consolidating said electrode by a heat treatment and/or thermomechanical treatment.

16. The process of claim 15, wherein the mixing step is carried out in two steps:
mixing the electronically conductive filler and the fluoropolymer binder using a solvent-free process or by co-spraying, to obtain an intimate mixture, then
mixing the active filler with said intimate mixture using a solvent-free process or by co-spraying, to obtain an electrode formulation.

17. The process of claim 15, wherein said mixing step is carried out by a process selected from the group of: agitation, air-jet mixing, milling of the mixture, high-shear mixing, mixing with a V-mixer, mixing with a screw mixer, double-cone mixing, drum mixing, conical mixing, double Z-arm mixing, mixing in a fluidized bed, in a planetary mixer, extrusion, calendering, and mechanofusion.

18. The process of claim 15, wherein said solvent-free process is carried out by depositing the electrode formulation on the metal substrate by a process chosen from the following processes: pneumatic spraying, electrostatic spraying, dipping in a fluidized powder bed, dusting, electrostatic transfer, deposition with rotary brushes, deposition with rotary metering rolls, and calendering.

19. The process of claim 15, wherein said solvent-free process is carried out in two steps: a first step which comprises producing a self-supporting film from the electrode formulation which has been premixed using a thermomechanical process, and a second step wherein the self-supporting film is assembled with the metal substrate by a process allying temperature and pressure.

20. The process of claim 15, wherein the consolidation of said electrode is carried out by at least one heat treatment selected from the group of passing through an oven, under an infrared lamp and through a calender with heated rolls.

21. A secondary Li-ion battery comprising an anode, a cathode and a separator, wherein at least one of the anode or cathode is the electrode according to claim 1.

\* \* \* \* \*